United States Patent [19]
Kasahara et al.

[11] Patent Number: 5,511,817
[45] Date of Patent: Apr. 30, 1996

[54] VEHICLE AXLE SUSPENSION SYSTEM

[75] Inventors: Tamiyoshi Kasahara, Yokosuka; Yohsuke Akatsu, Yokohama; Kenji Kawagoe, Yokosuka; Yutaka Endo, Atsugi; Hiroshi Noguchi, Utsunomiya, all of Japan

[73] Assignee: Nissan Motor Co., Ltd., Yokohama, Japan

[21] Appl. No.: 70,919

[22] Filed: Jun. 4, 1993

[30] Foreign Application Priority Data

Jun. 16, 1992 [JP] Japan .................. 4-156917

[51] Int. Cl.⁶ .................................. B60G 11/22
[52] U.S. Cl. .................. 280/717; 267/276; 280/660; 280/675; 280/688
[58] Field of Search ................. 280/717, 716, 280/661, 671, 673, 675, 660, 788, 688; 267/274, 276, 279, 280, 292

[56] References Cited

U.S. PATENT DOCUMENTS

| | | | |
|---|---|---|---|
| 4,589,677 | 5/1986 | Matschinsky | 280/675 |
| 4,621,830 | 11/1986 | Kanai | 267/274 |
| 4,723,791 | 2/1988 | Miura et al. | 280/671 |
| 4,943,092 | 7/1990 | Haraguchi | 280/717 |
| 4,966,384 | 10/1990 | Endo et al. | 280/660 |

FOREIGN PATENT DOCUMENTS

| | | | |
|---|---|---|---|
| 404627 | 12/1990 | European Pat. Off. | 280/717 |
| 496175 | 7/1992 | European Pat. Off. | 280/717 |
| 59-14511 | 1/1984 | Japan | B60G 25/00 |

*Primary Examiner*—Eric D. Culbreth
*Attorney, Agent, or Firm*—Foley & Lardner

[57] ABSTRACT

A vehicle axle suspension system including wheel support members for rotatably supporting road wheels, a suspension member for supporting the road wheel support members for vertical swinging movement, and elastic suspension elements. The elastic suspension elements include a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle. The elastic suspension elements are positioned to provide an understeer characteristic when a lateral force acts on a suspension roll center determined by suspension geometry to rotate the suspension member around a virtual roll axis extending through an elastic center of the front elastic suspension elements and an elastic center of the rear elastic suspension elements.

15 Claims, 12 Drawing Sheets

5,511,817

VEHICLE AXLE SUSPENSION SYSTEM

BACKGROUND OF THE INVENTION

This invention relates to an axle suspension system for use with an automotive vehicle.

For example, Japanese Patent Kokai No. 59-14511 discloses a vehicle axle suspension arranged to produce compliance toe angle changes in response to external forces exerted on the vehicle road wheels so as to improve the vehicle steering characteristic. With such a conventional vehicle axle suspension, however, the vehicle control stability cannot be improved to a satisfactory extent during a vehicle cornering operation. This stems mainly from the fact that the conventional vehicle steering characteristic control is made without regard to the moment produced on the suspension member around its virtual roll axis. This moment tends to provide an oversteer characteristic and also to change the camber angle of the offside road wheel in a positive direction to decrease the equivalent road wheel camber rigidity. As a result, the vehicle control stability is degraded during the vehicle cornering operation.

SUMMARY OF THE INVENTION

It is a main object of the invention to provide an improved vehicle axle suspension system which can improve the vehicle control stability to a great extent during a vehicle cornering operation.

There is provided in accordance with the invention, an axle suspension system for use with an automotive vehicle. The vehicle axle suspension system comprises road wheel support members for rotatably supporting road wheels, a suspension member for supporting the road wheel support members for vertical swinging movement, and elastic suspension elements. The elastic suspension elements include at least one front elastic suspension element positioned in front of the road wheel support members for elastically mounting the suspension member to the vehicle and at least two rear elastic suspension elements positioned at different suspension points behind the road wheel support members for elastically mounting the suspension member to the vehicle. Each of the elastic suspension elements has no anisotropy in a direction where the elastic suspension element is strained. The elastic suspension elements are positioned to provide an understeer characteristic when a lateral force acts on a suspension roll center, determined by suspension geometry, to rotate the suspension member around a virtual roll axis extending through an elastic center of the front elastic suspension element and an elastic center of the rear elastic suspension elements.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include at least two front elastic suspension elements positioned at different suspension points in front of the road wheel support members for elastically mounting the suspension member to the vehicle and at least one rear elastic suspension element positioned behind the road wheel support members for elastically mounting the suspension member to the vehicle. Each of the elastic suspension elements has no anisotropy in a direction where the elastic suspension element is strained. The elastic suspension elements are positioned to provide an understeer characteristic when a lateral force acts on a suspension roll center, determined by suspension geometry, to rotate the suspension member around a virtual roll axis extending through an elastic center of the front elastic suspension elements and an elastic center of the rear elastic suspension element.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle. Each of the elastic suspension elements has no anisotropy in a direction where the elastic suspension element is strained. The elastic suspension elements are positioned to provide an understeer characteristic when a lateral force acts on a suspension roll center, determined by suspension geometry, to rotate the suspension member around a virtual roll axis extending through an elastic center intermediate the front elastic suspension elements and an elastic center intermediate the rear elastic suspension elements.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include at least one front elastic suspension element provided in front of the road wheel support members for elastically mounting the suspension member to the vehicle and at least two rear elastic suspension elements provided at different suspension points behind the road wheel support members for elastically mounting the suspension member to the vehicle. Each of the elastic suspension elements has an anisotropy in a direction where the elastic suspension element is strained. The elastic suspension elements are positioned to provide an understeer characteristic when a lateral force acts on a suspension roll center, determined by suspension geometry, to rotate the suspension member around a virtual roll axis extending through a virtual elastic center determined based on the anisotropy of the front elastic suspension element and a virtual elastic center determined based on the anisotropy of the rear elastic suspension elements.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include at least two front elastic suspension elements provided at different suspension points in front of the road wheel support members for elastically mounting the suspension member to the vehicle and at least one rear elastic suspension element provided behind the road wheel support members for elastically mounting the suspension member to the vehicle. Each of the elastic suspension elements has an anisotropy in a direction where the elastic suspension element is strained. The elastic suspension elements are positioned to provide an understeer characteristic when a lateral force acts on a suspension roll center determined by suspension geometry to rotate the suspension member around a virtual roll axis extending through a virtual elastic center determined and based on the anisotropy of the front elastic suspension elements and a virtual elastic center determined based on the anisotropy of the rear elastic suspension element.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements includes a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle. Each of the elastic suspension elements has an anisotropy in a direction where the elastic suspension element is strained. The elastic suspension elements are positioned to provide an understeer characteristic when a lateral force acts on a suspension roll center determined by suspension geometry to rotate the suspension member around a virtual roll axis extending through a virtual elastic center determined and based on the anisotropy of the front elastic suspension elements and a virtual elastic center determined based on the anisotropy of the rear elastic suspension elements.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include at least one front elastic suspension element provided in front of the road wheel support members for elastically mounting the suspension member to the vehicle and at least two rear elastic suspension elements provided at different suspension points behind the road wheel support members for elastically mounting the suspension member to the vehicle. Each of the elastic suspension elements has an anisotropy in a direction where the elastic suspension element is strained. A virtual roll axis extends through a virtual elastic center determined based on the anisotropy of the front elastic suspension element and a virtual elastic center determined based on the anisotropy of the rear elastic suspension elements. An elastic axis extends through a simple center of the front elastic suspension element and a simple center of the rear elastic suspension elements. The elastic suspension elements are positioned to place the virtual roll axis below the elastic axis at least in a direction of height of a plane including a road wheel axis and normal to a vehicle longitudinal axis.

In another aspect of the invention, the vehicle axle suspension system comprises road wheel support members for rotatably supporting road wheels, a suspension member for supporting the road wheel support members for vertical swinging movement, and elastic suspension elements. The elastic suspension elements include at least two front elastic suspension elements provided at different suspension points in front of the road wheel support members for elastically mounting the suspension member to the vehicle and at least one rear elastic suspension element behind the road wheel support members for elastically mounting the suspension member to the vehicle. Each of the elastic suspension elements has an anisotropy in a direction where the elastic suspension element is strained. A virtual roll axis extends through a virtual elastic center determined based on the anisotropy of the front elastic suspension elements and a virtual elastic center determined and based on the anisotropy of the rear elastic suspension element. An elastic axis extends through a simple center of the front elastic suspension elements and a simple center of the rear elastic suspension element. The elastic suspension elements are positioned to place the virtual roll axis below the elastic axis at least in a direction of height of a plane including a road wheel axis and normal to a vehicle longitudinal axis.

In still another aspect of the invention, the vehicle axle suspension system comprises road wheel support members for rotatably supporting road wheels, a suspension member for supporting the road wheel support members for vertical swinging movement, and elastic suspension elements. The elastic suspension elements include a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle. Each of the elastic suspension elements has an anisotropy in a direction where the elastic suspension element is strained. A virtual roll axis extends through a virtual elastic center determined based on the anisotropy of the front elastic suspension elements and a virtual elastic center determined and based on the anisotropy of the rear elastic suspension elements. An elastic axis extends through a point intermediate the front elastic suspension elements and a point intermediate the rear elastic suspension elements. The elastic suspension elements are positioned to place the virtual roll axis below the elastic axis at least in a direction of height of a plane including a road wheel axis and normal to a vehicle longitudinal axis.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
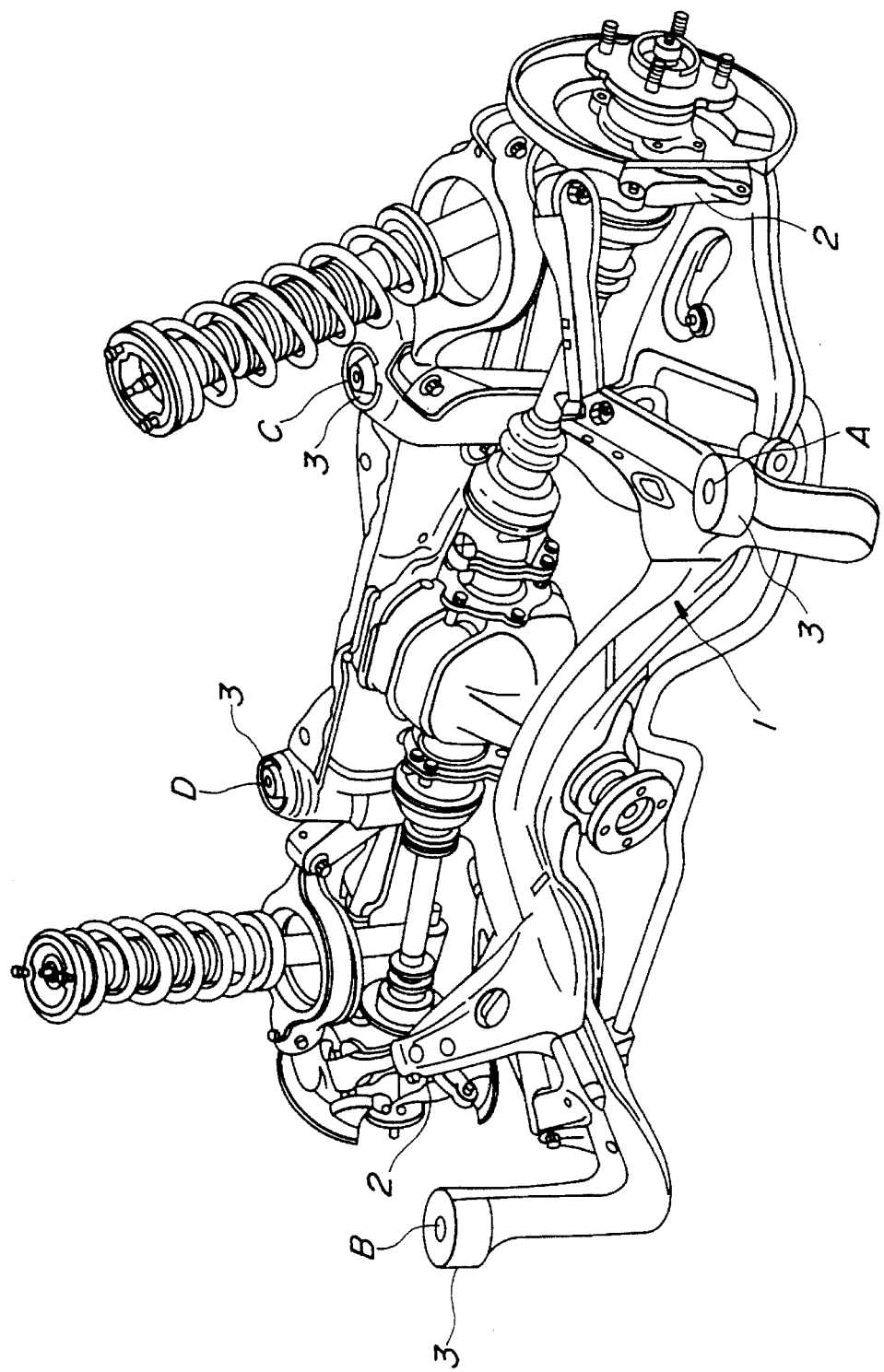
FIG. 1 is a perspective view showing one embodiment of a vehicle axle suspension system made in accordance with the invention.

With reference to the drawings and in particular to FIG. 1, there is shown a vehicle axle suspension system embodying the invention. The vehicle rear axle suspension is used with axles of road wheel support members 2. The road wheel support members 2 are provided for rotatably supporting the left and right rear road wheels of the vehicle. The vehicle axle suspension includes a suspension member 1 for supporting the support members 2 for vertical swinging movement. The suspension member 1 is suspended elastically flexibly at the floor of the vehicle body through four elastic suspension elements 3 located at respective different suspension points A, B, C and D. The suspension points A and B are located in front of the support members 2, and the suspension points C and D are located behind the support members 2. The elastic suspension elements 3 have no anisotropy in the direction of displacement thereof with respect to a lateral force f acting on the road wheels.

Figure 2:
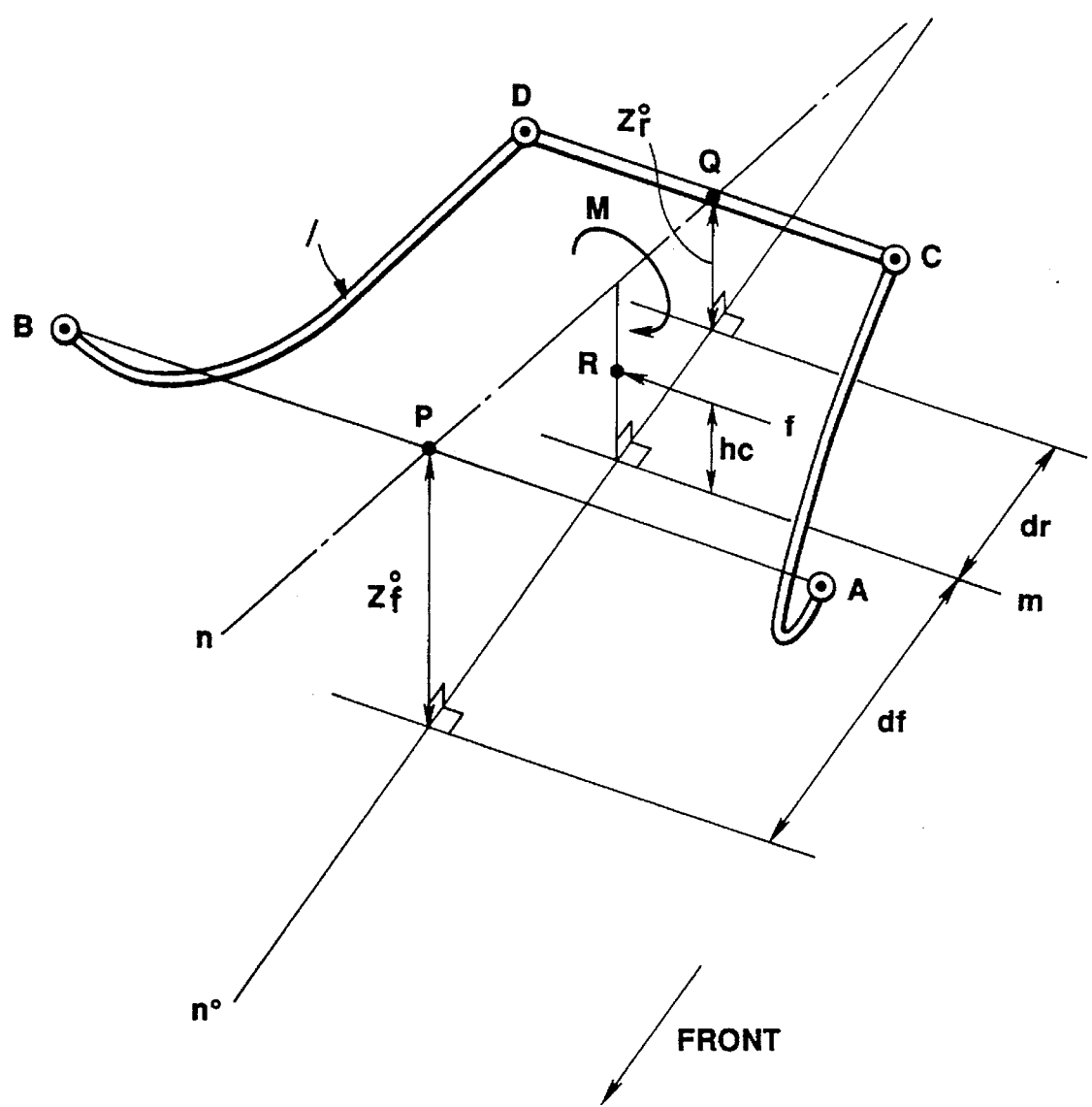
FIG. 2 is a diagram used in explaining the virtual roll axis of the suspension member set in the vehicle axle suspension system of FIG. 1.

The elastic suspension elements 3 are positioned with respect to the suspension member 1, as shown in FIG. 2. The character $n^0$ indicates a straight line in which first and second planes intersect, the first plane being a vertical plane including the vehicle longitudinal center line extending intermediate the left and right sides of the vehicle, the second plane being the road surface. The character m indicates a straight line in which third and fourth planes intersect, the third plane being a vertical plane including the road wheel axis, the fourth plane being the road surface. The character P indicates a point intermediate the front suspension points A and B. The character Q indicates a point intermediate the rear suspension points C and D. The character n indicates a straight line extending through the intermediate points P and Q. The character $Z_f^0$ indicates the height (ground clearance) of the intermediate point P with respect to the road surface. The character $Z_r^0$ indicates the height (ground clearance) of the intermediate point Q with respect to the road surface. The character $d_f$ indicates the distance of the intermediate point P with respect to the straight line m. The character $d_r$ indicates the distance of the intermediate point Q with respect to the straight line m. The character R indicates a roll center determined by the suspension geometry. The character hc indicates the height (ground clearance) of the roll center R with respect to the road surface.

The elastic suspension elements 3 are positioned at respective suspension points to satisfy the following Equations:

$$Z_f^0 > Z_r^0 \tag{1}$$

$$(d_r \cdot Z_f^0 + d_f Z_r^0)/((d_r + d_f)) > hc \tag{2}$$

Figure 3:
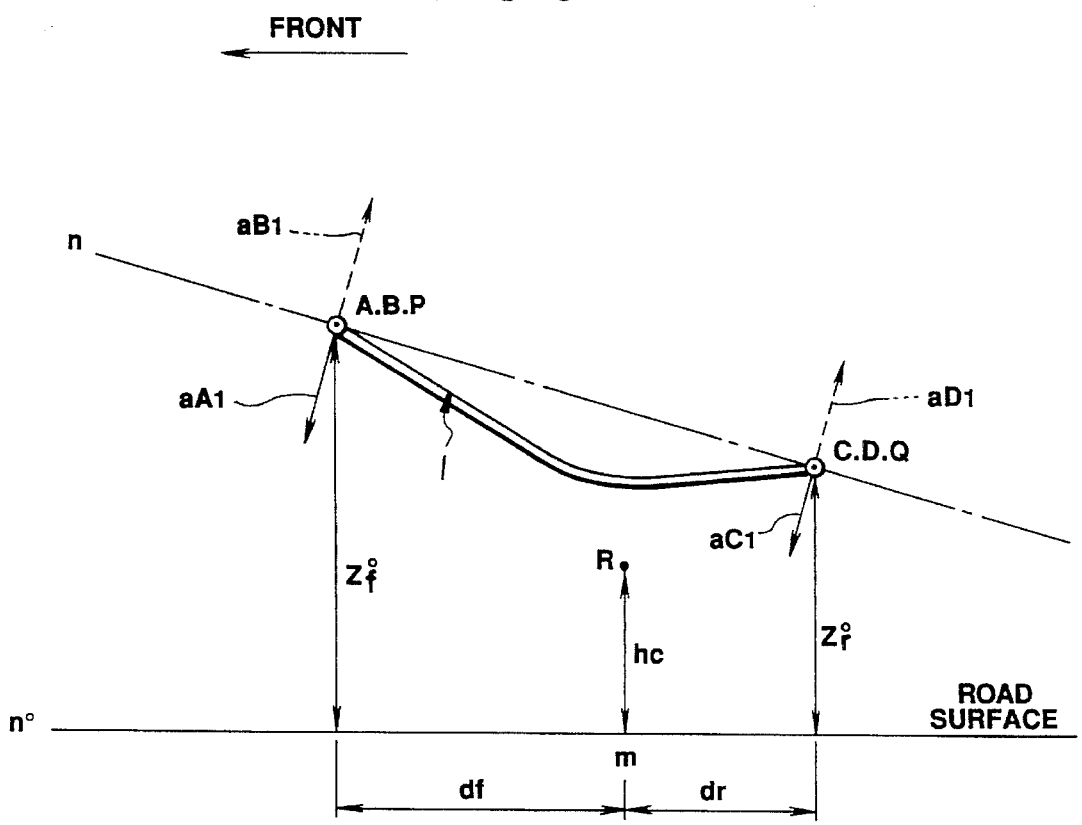
FIG. 3 is a side view used in explaining the function of the virtual roll axis of FIG. 2.

The operation of the vehicle axle suspension will be described in detail with reference to FIG. 3. Since the elastic suspension elements 3 have no anisotropy in the direction where they are strained in the presence of lateral forces acting on the road wheels, the intermediate point P is the front elastic center around which the suspension member 1 rotates elastically, whereas the intermediate point Q is the rear elastic center around which the suspension member 1 rotates elastically. Therefore, the straight line n, which extends through the intermediate points P and Q, is the virtual roll axis of the suspension member 1. It can be seen from Equation (1) that the front elastic center (intermediate point P) is located at a position higher than the rear elastic center (intermediate point Q). This means that the virtual roll axis n of the suspension member 1 is upgrade in the forward direction of the vehicle, as shown in FIG. 3. The left side of Equation (2) indicates the height of the virtual roll axis n at the position of the roll center R. It can be seen from Equation (2) that the virtual roll axis n is located at a position higher than the height hc of the roll center R. This means that the virtual roll axis n of the suspension member 1 is located above the roll center R.

During a vehicle cornering operation, lateral forces act on the respective road wheels at the points contacting with the road surface. These lateral forces are transmitted through the suspension link to produce a lateral force f acting on the suspension member 1 at the roll center R, as shown in FIG. 2. Under the lateral force f acting at the roll center R, the suspension member 1 is subject to a moment M around the virtual roll axis n of the suspension member 1. In this case, the virtual roll axis n is an upgrade straight line located above the roll center R. If the lateral force f is assumed to act at the roll center R in a direction from this side of the plane of the drawing (FIG. 3) to the other side thereof, the front left suspension point A will move diagonally as indicated by the solid arrow aA1 directed to the lower front, the front right suspension point B will move diagonally as indicated by the broken arrow aB1 directed to the upper rear, the rear left suspension point C will move diagonally as indicated by the solid arrow aC1 directed to the lower front, the rear right suspension point D will move diagonally as indicated by the broken arrow aD1 directed to the upper rear. Normally, the road wheels supported on this side of the plane of the drawing (FIG. 3) are offside wheels and the road wheels supported on the other side of the plane of the drawing (FIG. 3) are nearside wheels when the lateral force f acts from this side of the plane of the drawing (FIG. 3) to the other side thereof. In addition, this vehicle axle suspension is used as a vehicle rear axle suspension. Under these conditions, the rotation of the suspension member 1 around the virtual roll axis n causes the offside rear wheel to move in the forward direction so as to change its compliance toe angle in the toe-in direction and also the off side rear wheel to move in the rearward direction so as to change its compliance toe angle in the toe-out direction. This means that the compliance toe angles of the rear road wheels change in a direction providing an understeer characteristic so as to improve the vehicle control stability during the vehicle cornering operation.

Figure 4:
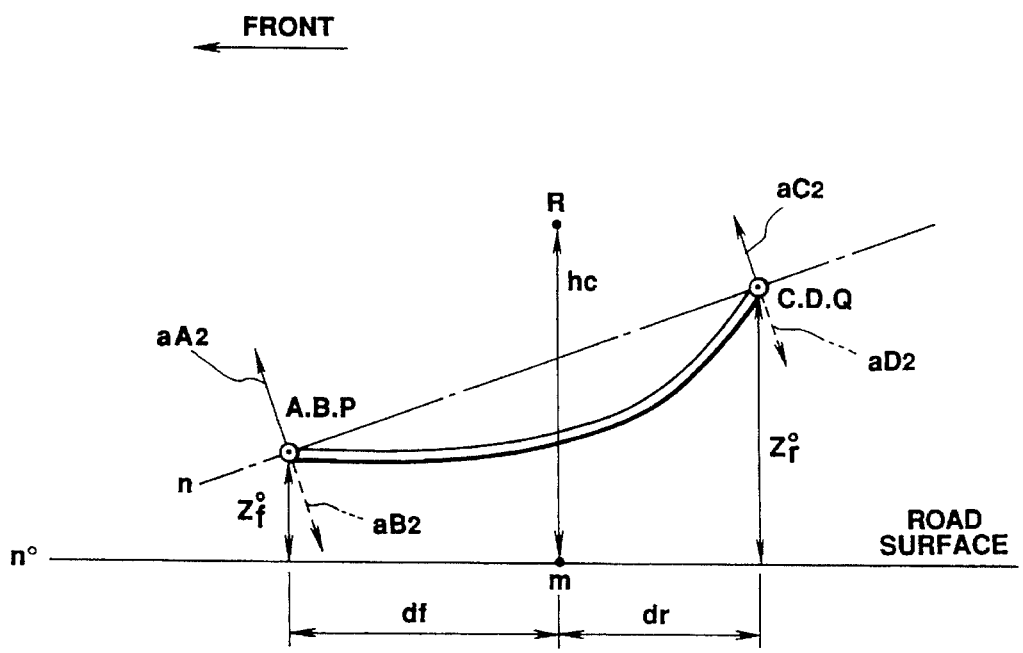
FIG. 4 is a side view used in explaining the function of a modified form of the virtual roll axis of FIG. 2.

Referring to FIG. 4, there is shown a modified form of the vehicle axle suspension system of the invention. In this modification, the elastic suspension elements 3 are located at respective suspension points to satisfy the following Equations:

$$Z_f^0 < Z_r^0 \quad (3)$$

$$(d_r \cdot Z_f^0 + d_f Z_r^0)/((d_r + d_f) < hc \quad (4)$$

Since the elastic suspension elements 3 have no anisotropy in the direction wherein they are strained in the presence of lateral force acting on the road wheels, the intermediate point P is the front elastic center around which the suspension member 1 rotates elastically, whereas the intermediate point Q is the rear elastic center around which the suspension member 1 rotates elastically. Therefore, the straight line n, which extends through the intermediate points P and Q, is the virtual roll axis of the suspension member 1. It can be seen from Equation (3) that the front elastic center (intermediate point P) is located at a position lower than the rear elastic center (intermediate point Q). This means that the virtual roll axis n of the suspension member 1 is downgrade in the forward direction of the vehicle, as shown in FIG. 4. It can be seen from Equation (4) that the virtual roll axis n of the suspension member 1 is located at a position lower than the height hc of the roll center R. This means that the virtual roll axis n of the suspension member 1 is located below the roll center R.

During a vehicle cornering operation, lateral forces act on the respective road wheels at the points contacting with the road surface. The lateral forces are transmitted through the suspension links to produce a lateral force f acting on the suspension member 1 at the roll center R. Under the lateral force f acting at the roll center R, the suspension member 1 is subject to a moment M around the virtual roll axis n of the suspension member 1. In this case, the virtual roll axis n is a downgrade straight line located below the roll center R. If the lateral force f is assumed to act at the roll center R in a direction from this side of the plane of the drawing (FIG. 4) to the other side thereof, the front left suspension point A will move diagonally as indicated by the solid arrow aA2 directed to the upper front, the front right suspension point B will move diagonally as indicated by the broken arrow aB2 directed to the lower rear, the rear left suspension point C will move diagonally as indicated by the solid arrow aC2 directed to the upper front, the rear right suspension point D will move diagonally as indicated by the broken arrow aD2 directed to the lower rear. Normally, the road wheels supported on this side of the plane of the drawing (FIG. 4) are offside road wheels and the road wheels supported on the other side of the plane of the drawing (FIG. 4) are nearside road wheels when the lateral force f acts from this side of the plane of the drawing (FIG. 4) to the other side thereof. In addition, this vehicle axle suspension is used as a vehicle rear axle suspension. Under these conditions, the rotation of the suspension member 1 around the virtual roll axis n changes the compliance toe angle of the offside rear road wheel in the toe-in direction and changes the compliance toe angle of the nearside rear road wheel in the toe-out direction. This means that the compliance toe angles of the rear road wheels change in a direction providing an understeer characteristic so as to improve the vehicle control stability during the vehicle cornering operation.

Although the invention has been described in connection with a vehicle rear axle suspension, it is to be understood that it is also applicable to a vehicle front axle suspension. In order to improve the vehicle control stability by changing the compliance toe angles of the front left and right road wheels to provide an understeer characteristic, the toe angles of the offside road wheels may be changed in the toe-out direction while changing the toe angles of the nearside road wheels in the toe-in direction. Therefore, the virtual roll axis n may be set at a position above the roll center R when the virtual roll axis n of the suspension member 1 is downgrade in the forward direction of the vehicle. These conditions are given as $$Z_f^0 < Z_r^0 \quad (5)$$

$$(d_r \cdot Z_f^0 + d_f Z_r^0)/((d_r + d_f) > hc \quad (6)$$

The virtual roll axis n may be set at a position below the roll center R when the virtual roll axis n of the suspension member 1 is upgrade in the forward direction of the vehicle. These conditions are given as $$Z^{f0} > Z_r^0 \quad (7)$$

$$(d_r \cdot Z_f^0 + d_f Z_r^0)/((d_r + d_f) < hc \quad (8)$$

It is, therefore, possible to position the elastic suspension elements based on the direction of the virtual roll axis n regardless of whether the vehicle axle suspension system is a front or rear axle suspension. That is, the elastic suspension elements may be positioned in such a manner that the roll center R is below the virtual roll axis n of the suspension member 1 when the virtual roll axis n is upgrade in the forward direction of the vehicle. The elastic suspension elements may be positioned or directed in such a manner that the roll center R is above the virtual roll axis when the virtual roll axis n is downgrade in the forward direction of the vehicle.

Figure 5:
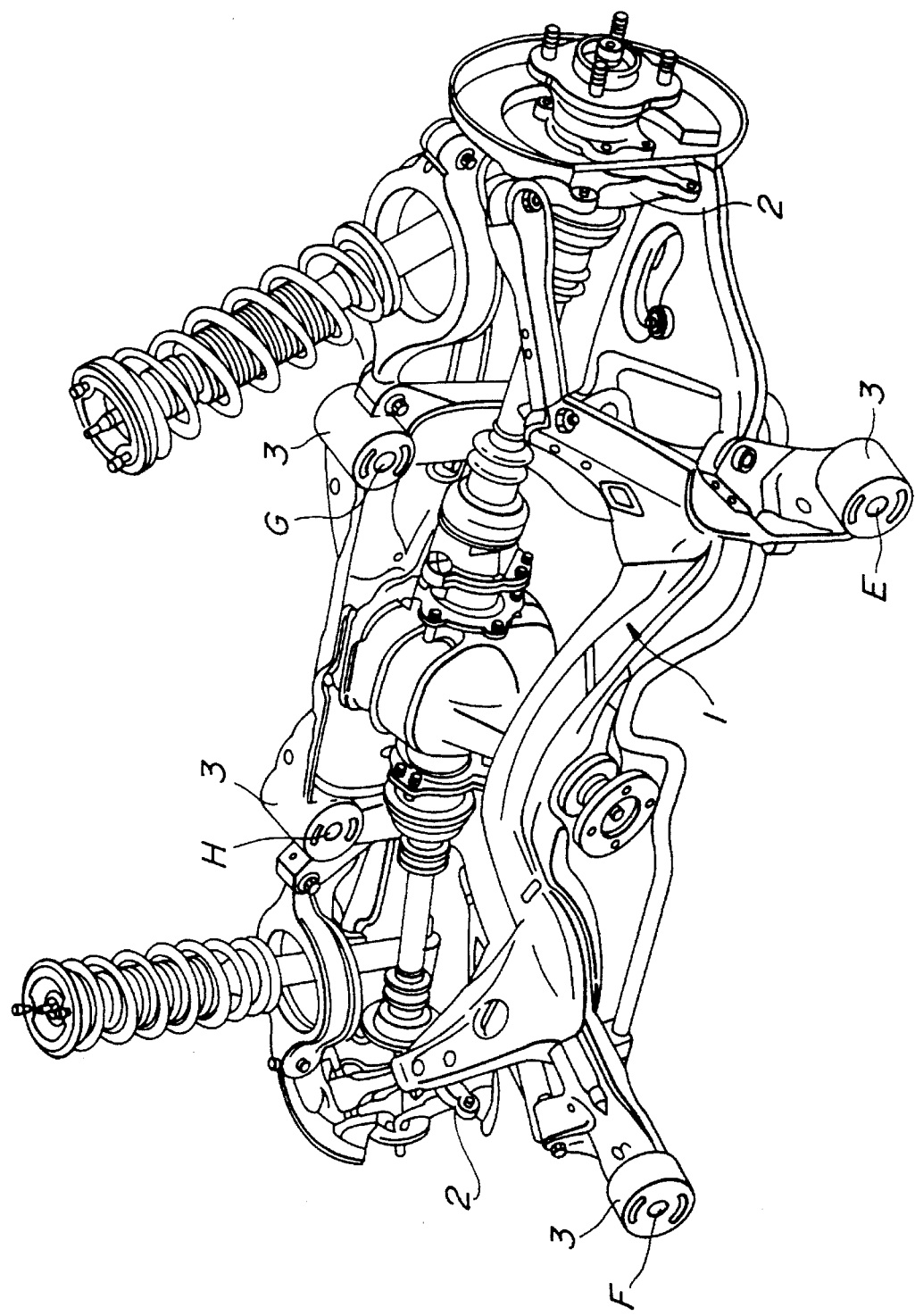
FIG. 5 is a perspective view showing a second embodiment of the vehicle axle suspension system of the invention.

Referring to FIG. 5, there is shown a second embodiment of the vehicle axle suspension system of the invention. In this embodiment, the vehicle axle suspension system will be described in connection with a multilink type vehicle rear axle suspension used with the rear road wheel support members 2 provided for rotatably supporting the left and right rear road wheels of the vehicle. The vehicle axle suspension includes a suspension member 1 for supporting the support members 2 for vertical swinging movement. The suspension member 1 is suspended elastically flexibly at the floor of the vehicle body through four elastic suspension elements 3 located at respective different suspension points E, F, G and H. The suspension points E and F are located in front of the support members 2, and the suspension points G and H are located behind the support members 2.

Each of the elastic suspension elements 3 is taken in the form of a cylindrical rubber member having a circular cross sectional area. The cylindrical rubber member has two diagonally opposite bow slots or grooves 3a formed in its circular surface near its periphery to reduce its rigidity at the bow slots 3a so as to provide an anisotropy in a direction where the elastic suspension element is strained in the presence of a lateral force acting on the road wheel. Thus, the elastic suspension element 3 has first and second axes perpendicular to each other, the first axis having a smaller degree of rigidity than the second axis. The elastic suspension elements 3 are mounted to the suspension member 1 at the respective suspension points E, F, G and H to provide a greater degree of rigidity in the transverse direction of the vehicle and a smaller degree of rigidity in the vertical direction of the vehicle. For this purpose, the front elastic suspension elements 3 are positioned to mount the suspension member 1 to the vehicle body at the respective suspension points E and F in such a manner that their second axes are somewhat upgrade toward a point intermediate between the left and right sides of the vehicle, as shown in FIG. 6, whereas the rear elastic suspension elements 3 are positioned to mount the suspension member 1 to the vehicle body at the respective suspension points G and H in such manner that their second axes are somewhat downgrade toward a point intermediate between the left and right sides of the vehicle, as shown in FIG. 7.

Figure 6:
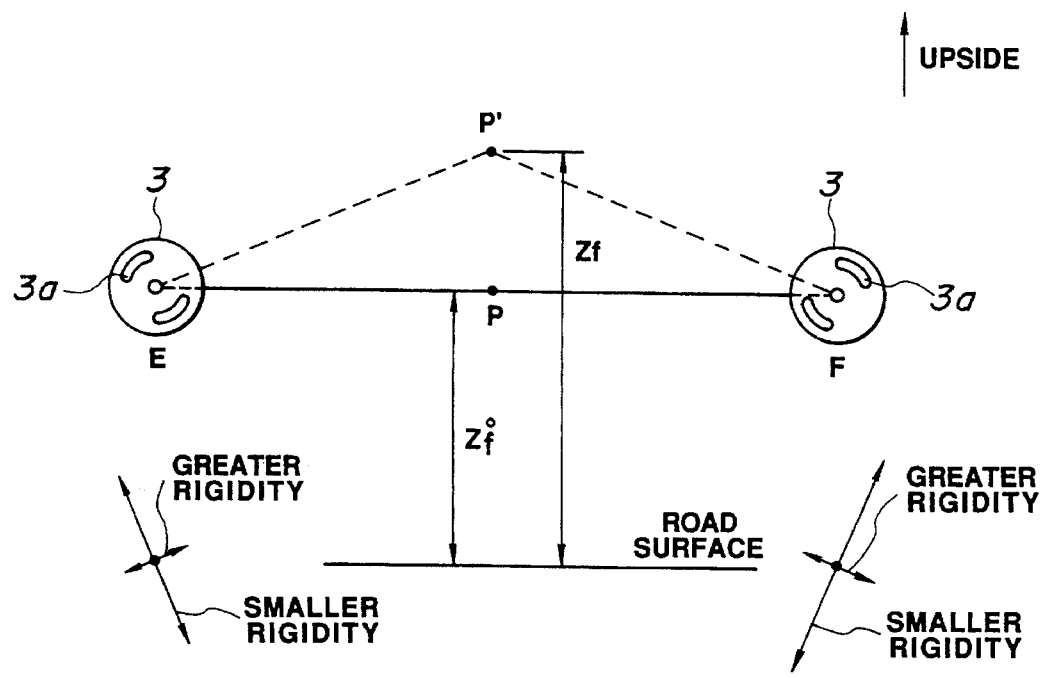
FIG. 6 is a rear view used in explaining the elastic center of the front elastic suspension elements used in the vehicle axle suspension system of FIG. 5.
Figure 7:
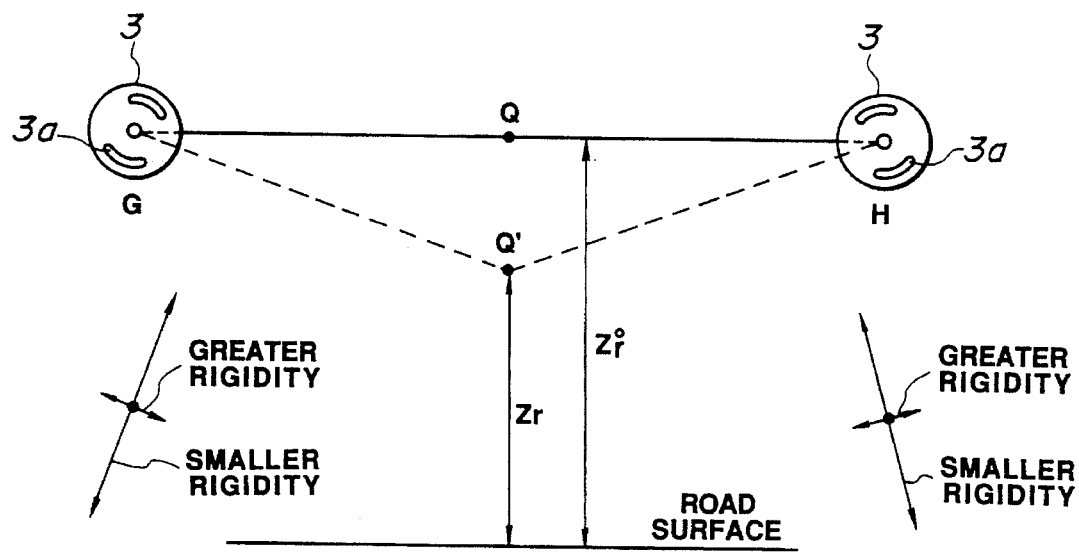
FIG. 7 is a rear view used in explaining the elastic center of the rear elastic suspension elements used in the vehicle axle suspension system of FIG. 5.

Since the elastic axes of the elastic suspension elements 3 are the second axes having a greater degree of rigidity, the elastic center of the front elastic suspension elements 3 moves upward to a point P' from the simple middle point P intermediate between the front elastic suspension elements 3, as shown in FIG. 6, and the elastic center of the rear elastic suspension elements 3 moves downward to a point Q' from the simple middle point Q intermediate between the front elastic suspension elements 3, as shown in FIG. 7. In this embodiment, thus, the virtual roll axis n of the suspension member 1 is a straight line extending through the elastic center points P' and Q'. The character $Z_f$ indicates the height of the elastic center point P' with respect to the road surface and the character $Z_r$ indicates the height of the elastic center point Q' with respect to the road surface.

Figure 8:
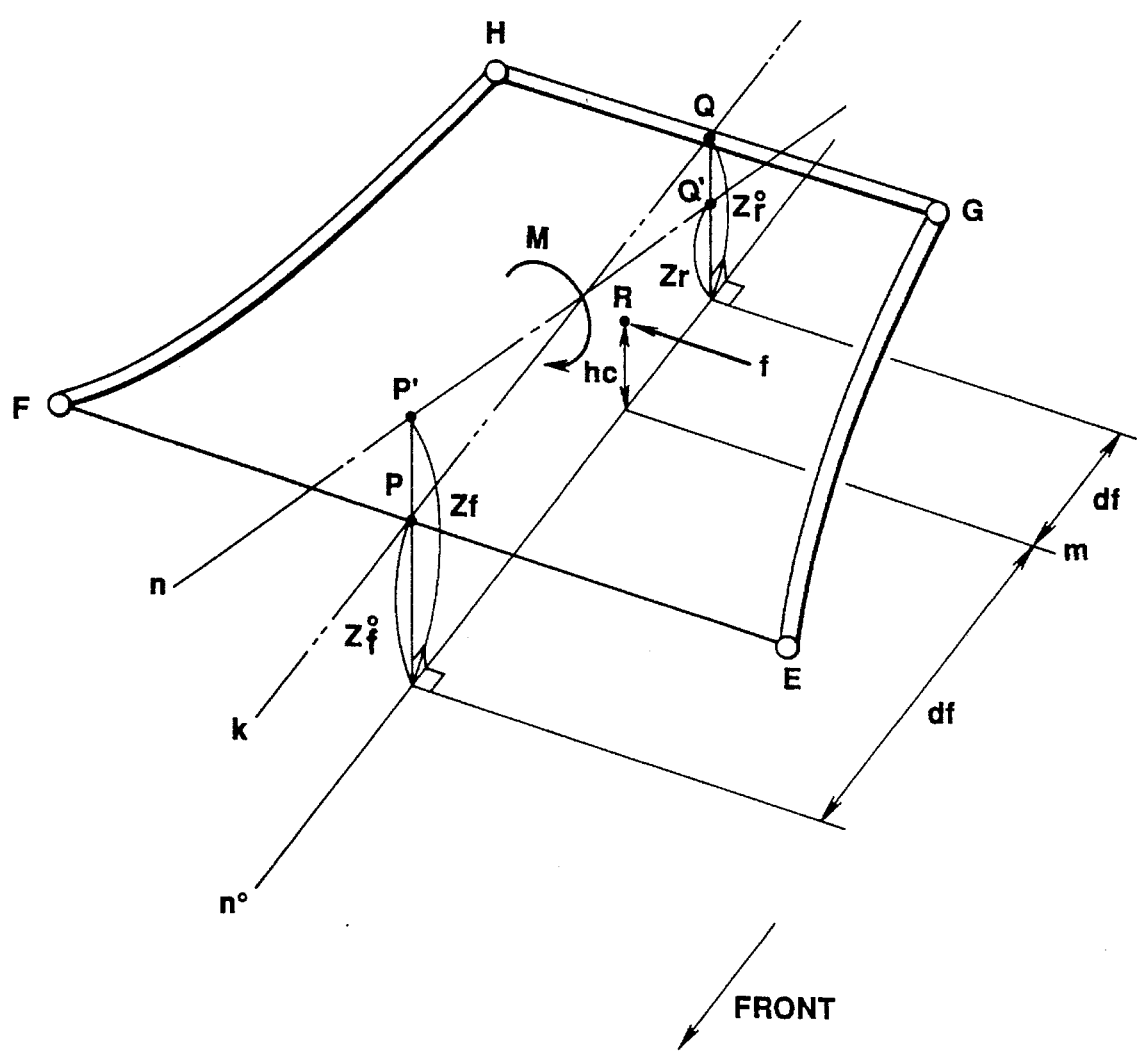
FIG. 8 is a diagram used in explaining the virtual roll axis of the suspension member set in the vehicle axle suspension system of FIG. 5.

Even where the virtual roll axis n of the suspension member 1 changes from the straight line k extending through the intermediate points P and Q, it is possible to improve the vehicle control stability in a manner similar to the manner described in connection with the first embodiment. For example, the virtual roll axis n is set above the roll center R when the virtual roll axis n of the suspension member 1 is upgrade in the forward direction of the vehicle, as shown in FIG. 8. For this purpose, the elastic suspension elements 3 are positioned at the respective suspension points to satisfy the following Equations:

$$Z_f > Z_r \qquad (9)$$

$$(d_r \cdot Z_f + d_f \cdot Z_r)/((d_r + d_f) > hc \qquad (10)$$

If the elastic suspension elements 3 are positioned to satisfy Equations (9) and (10), the lateral force f acting on the suspension member 1 at the roll center R will produce a moment M around the virtual roll axis n of the suspension member 1 to change the compliance toe angle of the offside rear road wheel in the toe-in direction and the compliance toe angle of the nearside rear road wheel in the toe-out so as to provide an understeer characteristic during a vehicle cornering operation. This is effective to improve the vehicle control stability during the vehicle cornering operation.

If the height of the elastic axis k extending through the intermediate points P and Q at the position corresponding to the roll center R is greater than the height hc of the roll center R, that is, the elastic axis k is above the roll center R, and the elastic axis k is downgrade in the forward direction of the vehicle, the elastic axis k of the elastic suspension elements 3 may be set in such a manner that the virtual roll axis n of the suspension member 1 is upgrade in the forward direction of the vehicle. In this case, another condition is added to the conditions given by Equations (9) and (10). This condition is given by the following equation:

$$Z_f - Z_f^0 > Z_r - Z_r^0 \qquad (11)$$

If the virtual roll axis n of the suspension member 1 is downgrade in the forward direction of the vehicle, the height of the virtual roll axis n of the suspension member 1 at the position corresponding to the roll center R may be less than the height hc of the roll center R, that is, the virtual roll axis n may be set below the roll center R. In this case, the elastic suspension elements 3 may be located at the respective suspension points to satisfy the following Equations:

$$Z_f < Z_r \qquad (12)$$

$$(d_r \cdot Z_f + d_f \cdot Z_r)/((d_r + d_f) < hc \qquad (13)$$

If the elastic suspension elements 3 are positioned to satisfy Equations (12) and (13), the lateral force f acting on the suspension member 1 at the roll center R will produce a moment M around the virtual roll axis n of the suspension member 1 to change the compliance toe angle of the offside rear road wheel in the toe-in direction and the compliance toe angle of the nearside rear road wheel in the toe-out so as to provide an understeer characteristic during a vehicle cornering operation. This is effective to improve the vehicle control stability during the vehicle cornering operation.

If the height of the elastic axis k extending through the intermediate points P and Q at the position corresponding to the roll center R is less than the height hc of the roll center R, that is, the elastic axis k is below the roll center R, and the elastic axis k is upgrade in the forward direction of the vehicle, another condition is added to the conditions given by Equations (12) and (13). This condition is given by the following equation:

$$Z_f - Z_f^0 < Z_r - Z_r^0 \qquad (14)$$

If the vehicle axle suspension system of the invention is a vehicle front axle suspension and the virtual roll axis n of the suspension member 1 is upgrade in the forward direction of the vehicle, the height of the virtual roll axis n of the suspension member 1 at the position corresponding to the roll center R may be less than the height hc of the roll center R, that is, the virtual roll axis n may be set below the roll center R. In this case, the elastic suspension elements 3 may be located at the respective suspension points to satisfy the following Equations:

$$Z_f > Z_r \qquad (15)$$

$$(d_r \cdot Z_f + d_f \cdot Z_r)/((d_r + d_f) < hc \qquad (16)$$

If the elastic suspension elements 3 are positioned to satisfy Equations (15) and (16), the lateral force f acting on the suspension member 1 at the roll center R will produce a moment M around the virtual roll axis n of the suspension member 1 to change the compliance toe angle of the offside front road wheel in the toe-out direction and the compliance toe angle of the nearside front road wheel in the toe-in so as to provide an understeer characteristic during a vehicle cornering operation. This is effective to improve the vehicle control stability during the vehicle cornering operation.

If the elastic axis k extending through the intermediate points P and Q is required to be upgrade in the forward direction of the vehicle because of space limitations, another condition may be added to the conditions given by Equations (15) and (16). This condition is given by the following equation:

$$Z_f - Z_f^0 > Z_r - Z_r^0 \qquad (17)$$

If the virtual roll axis n of the suspension member 1 is downgrade in the forward direction of the vehicle, the height of the virtual roll axis n of the suspension member 1 at the position corresponding to the roll center R may be greater than the height hc of the roll center R, that is, the virtual roll axis n may be set above the roll center R. In this case, the elastic suspension elements 3 may be located at the respective suspension points to satisfy the following Equations:

$$Z_f < Z_r \tag{18}$$

$$(d_r \cdot Z_f + d_f \cdot Z_r)/((d_r + d_f) > hc \tag{19}$$

If the elastic suspension elements 3 are positioned to satisfy Equations (18) and (19), the lateral force f acting on the suspension member 1 at the roll center R will produce a moment M around the virtual roll axis n of the suspension member 1 to change the compliance toe angle of the off side rear road wheel in the toe-in direction and the compliance toe angle of the nearside rear road wheel in the toe-out so as to provide an understeer characteristic during a vehicle cornering operation. This is effective to improve the vehicle control stability during the vehicle cornering operation.

If the elastic axis k extending through the intermediate points P and Q is required to be downgrade in the forward direction of the vehicle because of space limitations, another condition is added to the conditions given by Equations (18) and (19). This condition is given by the following equation:

$$Z_f - Z_f^0 < Z_r - Z_r^0 \tag{20}$$

Figure 9:
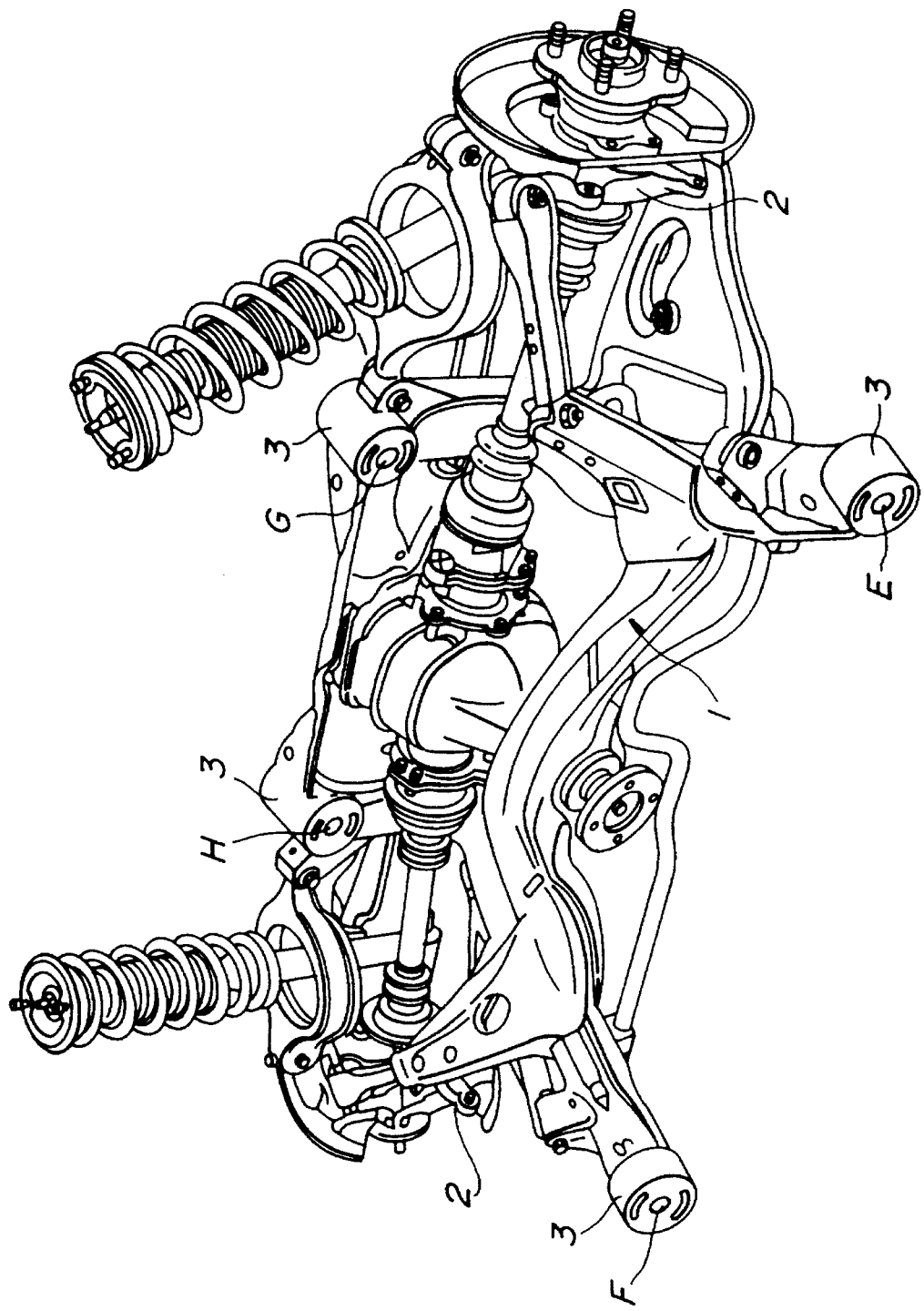
FIG. 9 is a perspective view showing a third embodiment of the vehicle axle suspension system of the invention.

Referring to FIG. 9, there is shown a third embodiment of the vehicle axle suspension system of the invention. In this embodiment, the vehicle axle suspension system will be described in connection with a multilink type vehicle rear axle suspension used with the rear road wheel support members 2 provided for rotatably supporting the left and right rear road wheels of the vehicle. The vehicle axle suspension includes a suspension member 1 for supporting the support members 2 for vertical swinging movement. The suspension member 1 is suspended elastically flexibly at the floor of the vehicle body through four elastic suspension elements 3 located at respective different suspension points E, F, G and H. The suspension points E and F are located in front of the support members 2, and the suspension points G and H are located behind the support members 2.

Each of the elastic suspension elements 3 is taken in the form of a cylindrical rubber member having a circular cross sectional area. The cylindrical rubber member has two diagonally opposite bow slots or grooves 3a formed in its circular surface near its periphery to reduce its rigidity at the bow slots 3a so as to provide an anisotropy in a direction where the elastic suspension element is strained in the presence of a lateral force acting on the road wheel. Thus, the elastic suspension element 3 has first and second axes perpendicular to each other, the first axis having a smaller degree of rigidity than the second axis. The elastic suspension elements 3 are mounted to the suspension member 1 at the respective suspension points E, F, G and H to provide a greater degree of rigidity in the transverse direction of the vehicle and a smaller degree of rigidity in the vertical direction of the vehicle. For this purpose, the front elastic suspension elements 3 are positioned to mount the suspension member 1 to the vehicle body at the respective suspension points E and F in such a manner that their second axes are somewhat downgrade toward a point P' intermediate between the left and right sides of the vehicle, as shown in FIG. 10, whereas the rear elastic suspension elements 3 are positioned to mount the suspension member 1 to the vehicle body at the respective suspension points G and H in such manner that their second axes are somewhat upgrade toward a point Q' intermediate between the left and right sides of the vehicle, as shown in FIG. 11.

Figure 10:
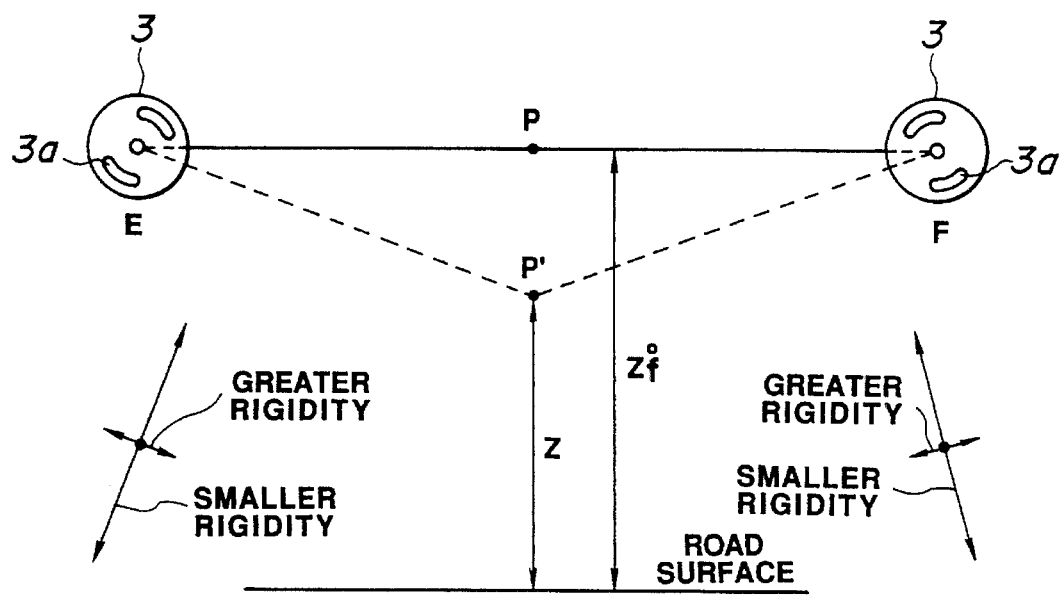
FIG. 10 is a rear view used in explaining the elastic center of the front elastic suspension elements used in the vehicle axle suspension system of FIG. 9.
Figure 11:
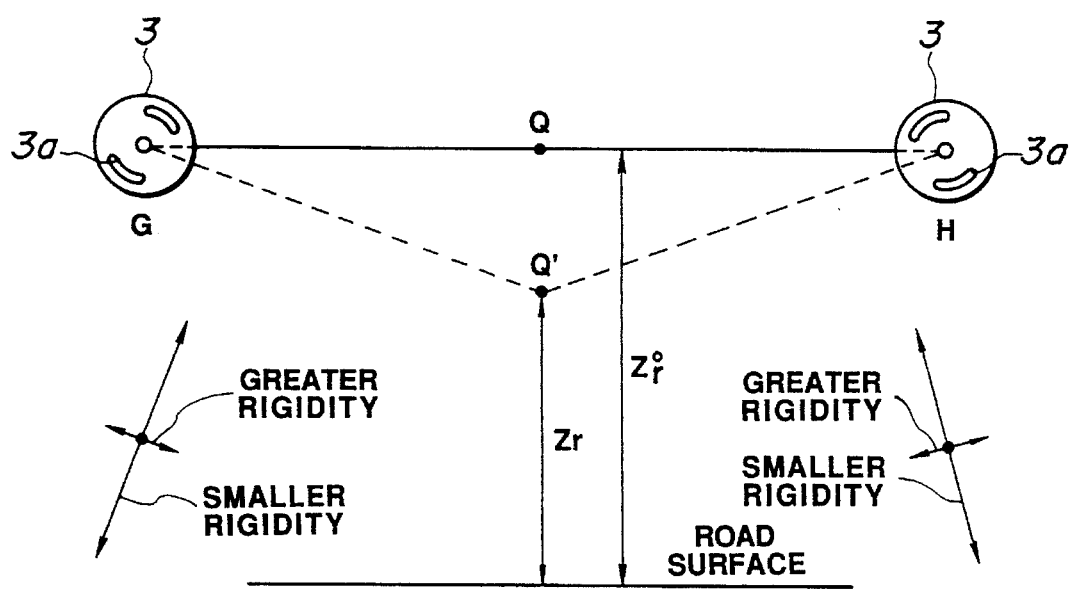
FIG. 11 is a rear view used in explaining the elastic center of the rear elastic suspension elements used in the vehicle axle suspension system of FIG. 9.
Figure 12:
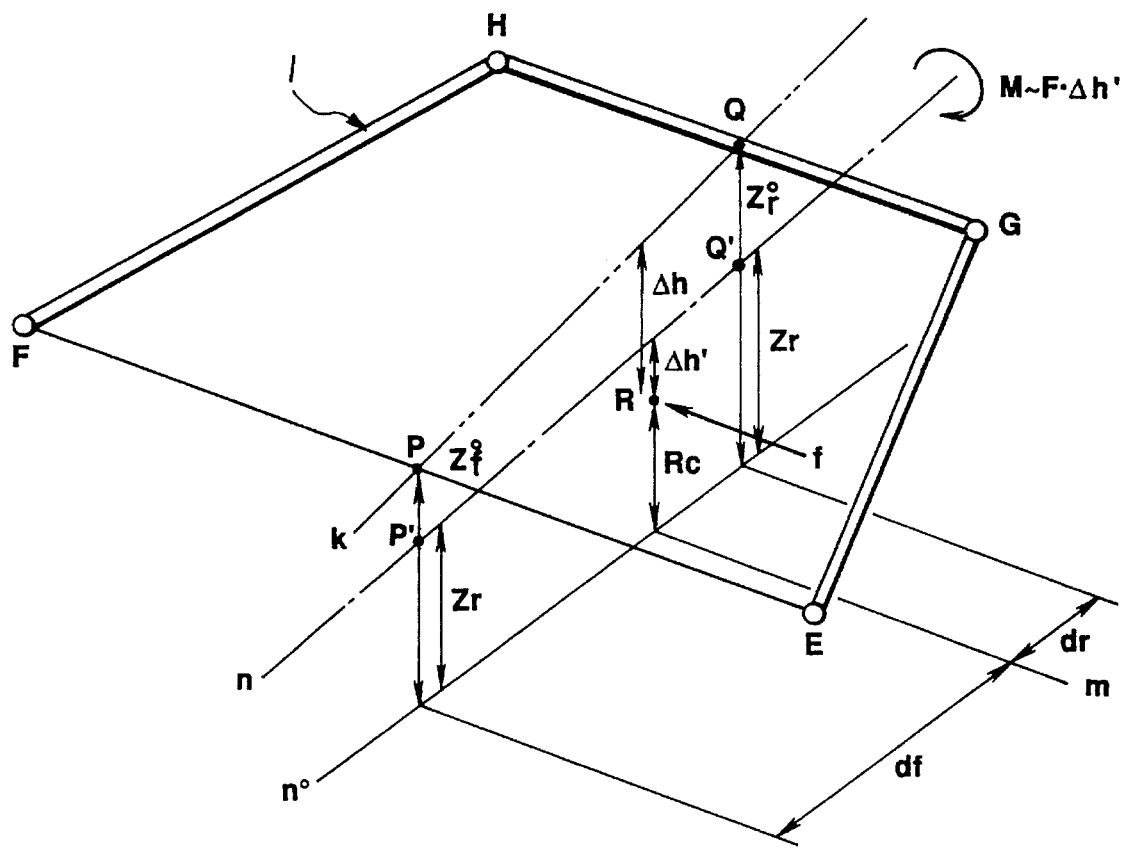
FIG. 12 is a diagram used in explaining the virtual roll axis of the suspension member set in the vehicle axle suspension system of FIG. 9.

The elastic center of the front elastic suspension elements 3 moves upward to the point P' from the simple middle point P intermediate between the front elastic suspension elements 3, as shown in FIG. 10, and the elastic center of the rear elastic suspension elements 3 moves downward to the point Q' from the simple middle point Q intermediate between the front elastic suspension elements 3, as shown in FIG. 11. In this embodiment, therefore, the virtual roll axis n of the suspension member 1 is a straight line extending through the elastic center points P' and Q' and it is positioned below the elastic axis k extending through the intermediate points P and Q, as shown in FIG. 12. The height (distance) $\Delta h'$ of the virtual roll axis n of the suspension member 1 at the position corresponding to the roll center R is less than the height (distance) $\Delta h$ of the elastic axis k with respect to the roll center R. This condition is given by Equation (21). In this embodiment, the virtual roll axis n of the suspension member 1 is positioned above the roll center R. This condition is given by Equation (22).

$$\frac{d_r \cdot (Z_f - Z_f^0) + d_f \cdot (Z_r - Z_r^0)}{d_r + d_f} < 0 \tag{21}$$

$$\frac{d_r \cdot Z_f + d_f \cdot Z_r}{d_r + d_f} > hc \tag{22}$$

Figure 13:
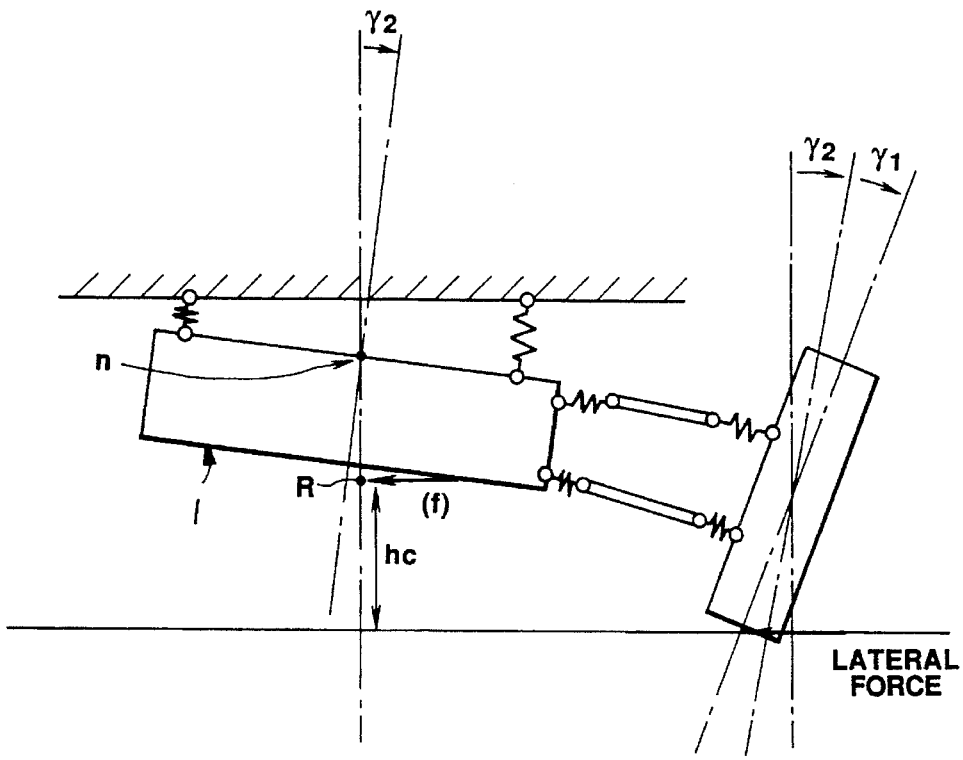
FIG. 13 is an elevational view used in explaining a change of the camber angle of the offside road wheel in the vehicle axle suspension system of FIG. 9.

If the elastic suspension elements 3 are positioned to satisfy Equations (21) and (22), the moment M produced around the virtual roll axis n of the suspension member 1, tending to rotate the offside road wheel downward, by the lateral force f acting on the suspension member 1 at the roll center R will be less than the moment produced around the elastic axis k by the lateral force f. As a result, the roll angle change $\gamma_2$ of the suspension member 1 decreases to decrease the change $(\gamma_1 + \gamma_2)$ of the road wheel camber angle in the positive direction so as to increase the camber rigidity of the vehicle axle suspension with respect to the lateral force. This is effective to improve the vehicle control stability during a vehicle cornering operation. As shown in FIG. 13, the camber angle change $\gamma_1$ is produced when the bushes used in the suspension links change in the presence of the lateral force acting on the respective road wheels.

Figure 14:
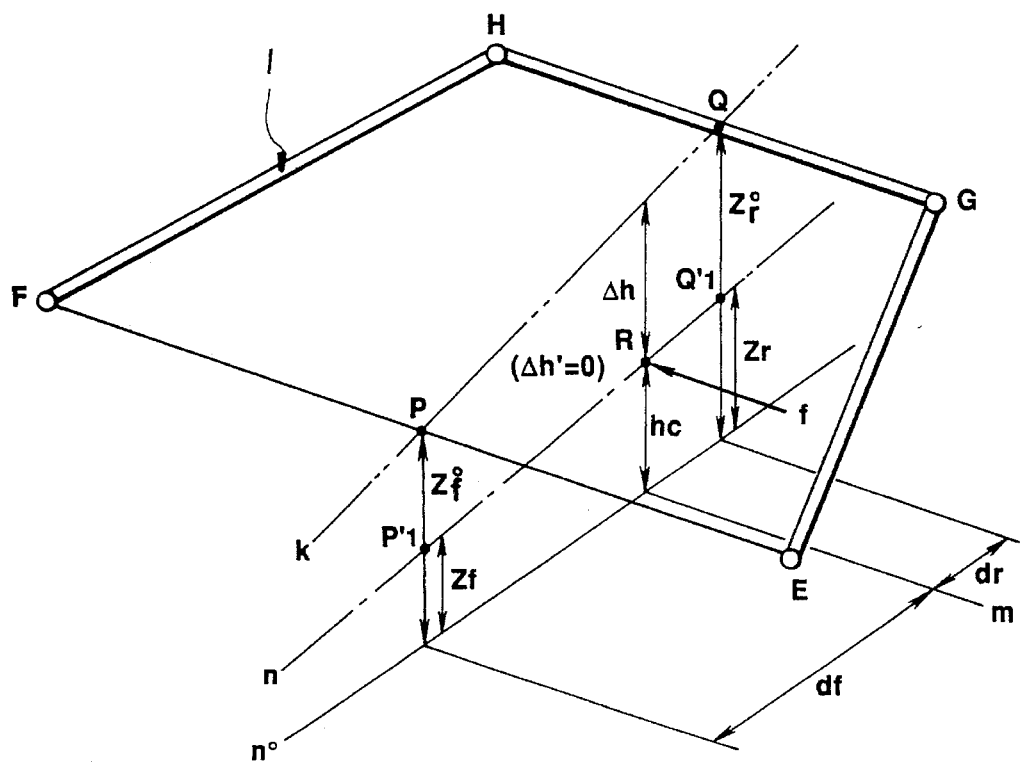
FIG. 14 is a diagram used in explaining the virtual roll axis of the suspension member set in a fourth embodiment of the vehicle axle suspension system of the invention.

Referring to FIG. 14, there is shown a fourth embodiment of the vehicle axle suspension system of the invention. In this embodiment, the vehicle axle suspension system will be described in connection with a multilink type vehicle rear axle suspension used with the rear axles provided for rotatably supporting the left and right rear road wheels of the vehicle. The vehicle axle suspension includes a suspension member 1 for supporting the axles for vertical swinging movement. The suspension member 1 is suspended elastically flexibly at the floor of the vehicle body through four elastic suspension elements located at respective different suspension points E, F, G and H, as described in connection with the third embodiment. The suspension points E and F are located in front of the axles, and the suspension points G and H are located behind the axles.

Each of the elastic suspension elements 3 is taken in the form of a cylindrical rubber member having a circular cross sectional area. The cylindrical rubber member has two diagonally opposite bow slots or grooves formed in its circular surface near its periphery to reduce its rigidity at the bow slots so as to provide an anisotropy in a direction where the elastic suspension element is strained in the presence of a lateral force acting on the road wheel, as described in connection with the third embodiment. Thus, the elastic suspension element has first and second axes perpendicular to each other, the first axis having a smaller degree of rigidity than the second axis. The elastic suspension elements are mounted to the suspension member 1 at the respective suspension points E, F, G and H to provide a greater degree of rigidity in the transverse direction of the vehicle and a smaller degree of rigidity in the vertical direction of the vehicle. The front elastic suspension elements are positioned to mount the suspension member 1 to the vehicle body at the respective suspension points E and F in such a manner that their second axes are somewhat downgrade toward a point P'1 intermediate between the left and right sides of the vehicle. The point P'1 is located at a height lower than the height of the point P' of FIG. 10. The rear elastic suspension elements are positioned to mount the suspension member 1 to the vehicle body at the respective suspension points G and H in such manner that their second axes are somewhat upgrade toward a point Q'1 intermediate between the left and right sides of the vehicle. The point Q'1 is located at a height lower than the height of the point Q' of FIG. 11. The virtual roll axis n of the suspension member 1 extends through the elastic center points P'1 and Q'1. In this embodiment, the virtual roll axis n extends through the roll center R. This condition is given by Equations (21) and (23).

$$(d_r \cdot Z_f + d_f Z_r)/(d_r + d_f) = hc \qquad (23)$$

Figure 15:
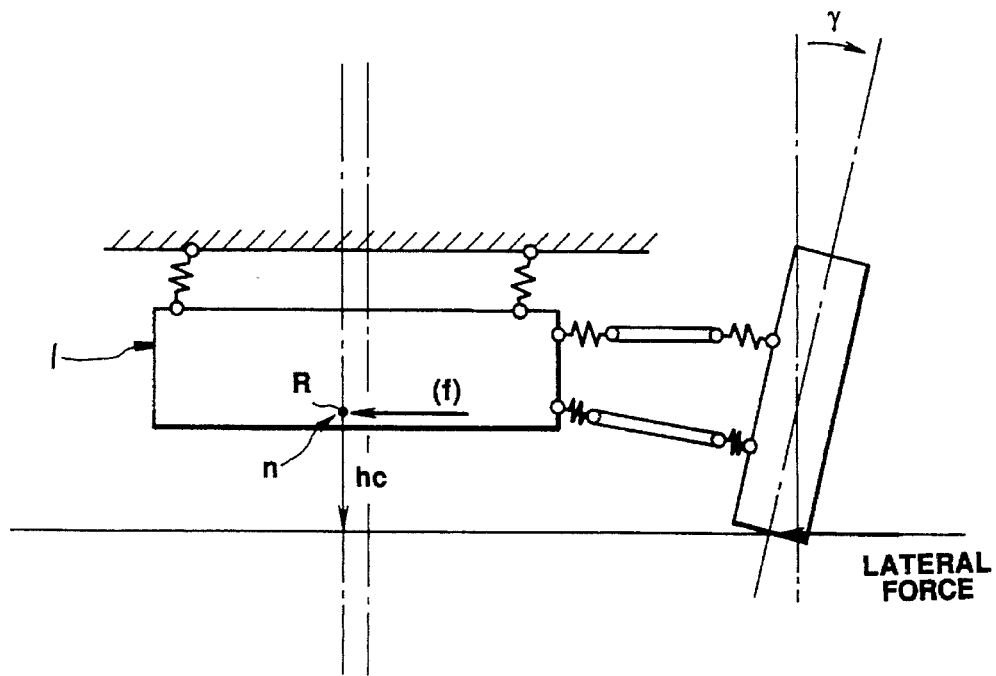
FIG. 15 is an elevational view used in explaining a change of the camber angle of the offside road wheel in the vehicle axle suspension system of FIG. 14.

If the elastic suspension elements are positioned to satisfy Equations (21) and (23), no moment will be produced around the virtual roll axis n of the suspension member 1 even when a lateral force acts on the suspension member 1 at the roll center R. Since the suspension member 1 is subject to no roll angle change $\gamma_2$ (=0), it is possible to further decrease the change ($\gamma_1 + \gamma_2$) of the road wheel camber angle in the positive direction so as to further increase the camber rigidity of the vehicle axle suspension with respect to the lateral force. This is effective to further improve the vehicle control stability during a vehicle cornering operation. As shown in FIG. 15, the camber angle change $\gamma$ is produced when the bushes used in the suspension links change in the presence of the lateral force acting on the respective road wheels.

Figure 16:
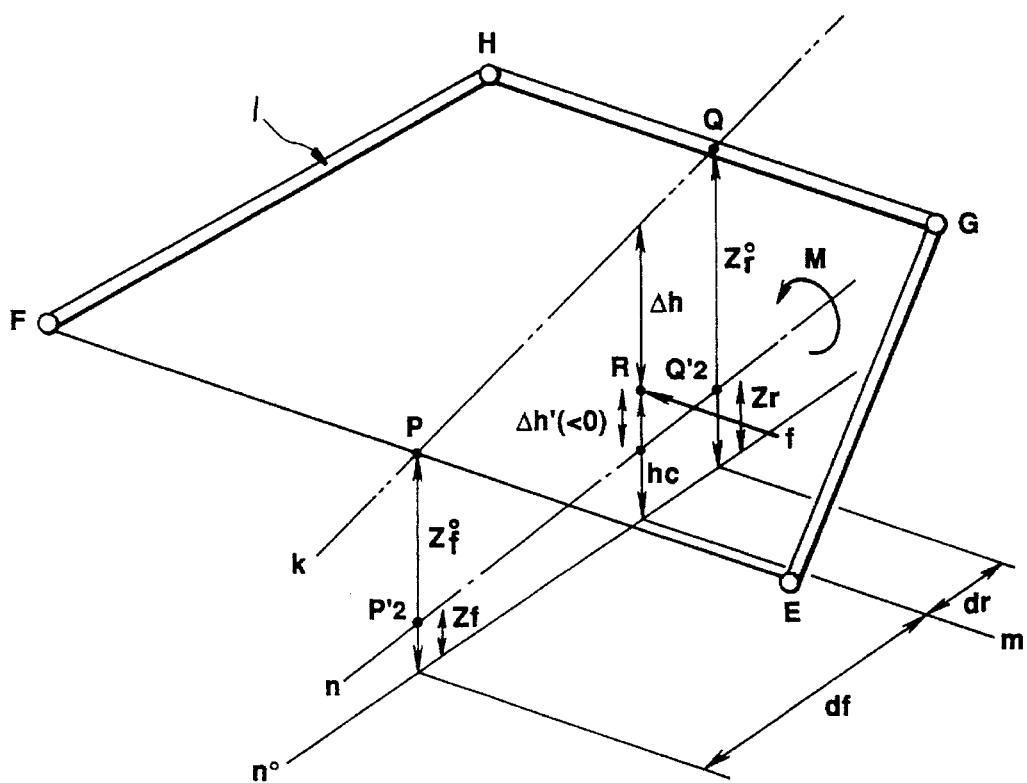
FIG. 16 is a diagram used in explaining the virtual roll axis of the suspension member set in a fifth embodiment of the vehicle axle suspension system of the invention.
Figure 17:
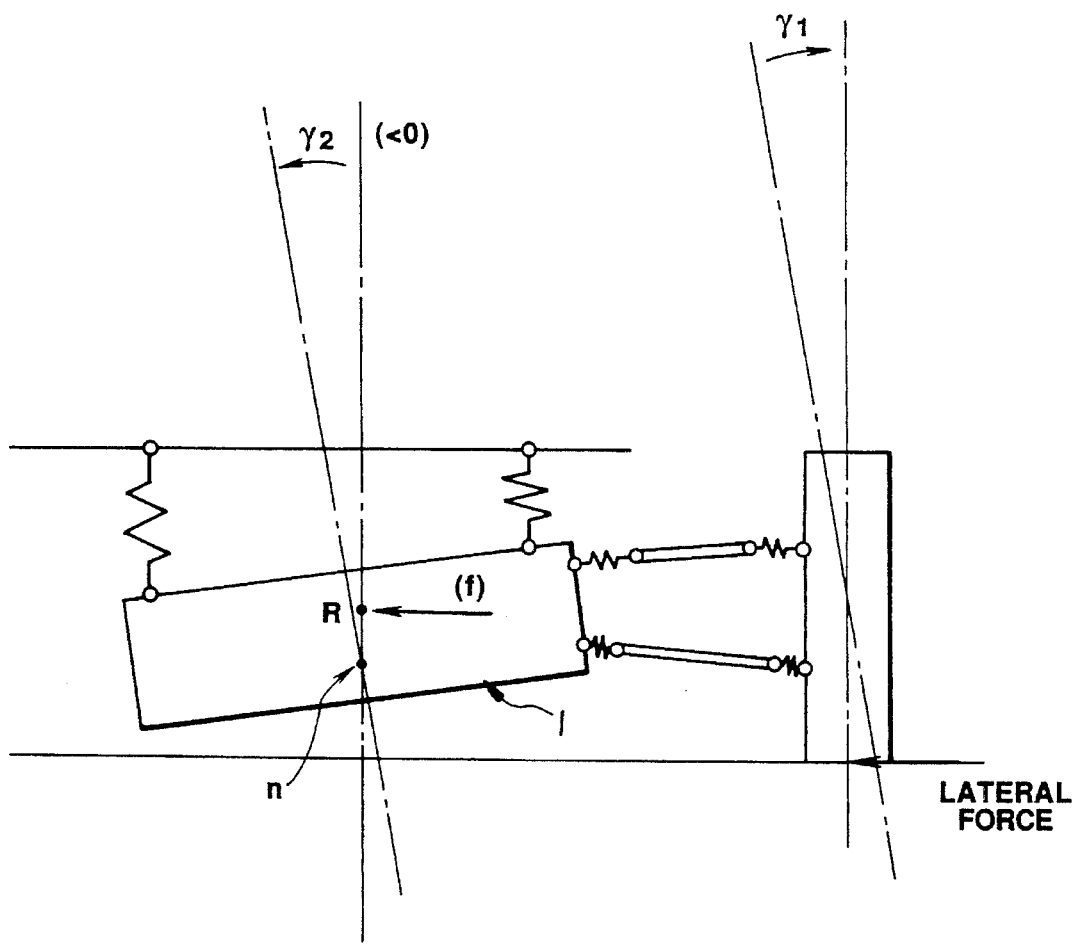
FIG. 17 is an elevational view used in explaining a change of the camber angle of the offside road wheel in the vehicle axle suspension system of FIG. 16.

Referring to FIG. 16, there is shown a fifth embodiment of the vehicle axle suspension system of the invention. In this embodiment, the vehicle axle suspension system will be described in connection with a multilink type vehicle rear axle suspension used with the rear road wheel support member provided for rotatably supporting the left and right rear road wheels of the vehicle. The vehicle axle suspension includes a suspension member 1 for supporting the axles for vertical swinging movement. The suspension member 1 is suspended elastically flexibly at the floor of the vehicle body through four elastic suspension elements located at respective different suspension points E, F, G and H, as described in connection with the third embodiment. The suspension points E and F are located in front of the axles, and the suspension points G and H are located behind the axles.

Each of the elastic suspension elements 3 is taken in the form of a cylindrical rubber member having a circular cross sectional area. The cylindrical rubber member has two diagonally opposite bow slots or grooves formed in its circular surface near its periphery to reduce its rigidity at the bow slots so as to provide an anisotropy in a direction where the elastic suspension element is strained in the presence of a lateral force acting on the road wheel, as described in connection with the third embodiment. Thus, the elastic suspension element has first and second axes perpendicular to each other, the first axis having a smaller degree of rigidity than the second axis. The elastic suspension elements are mounted to the suspension member 1 at the respective suspension points E, F, G and H to provide a greater degree of rigidity in the transverse direction of the vehicle and a smaller degree of rigidity in the vertical direction of the vehicle. The front elastic suspension elements are positioned to mount the suspension member 1 to the vehicle body at the respective suspension points E and F in such a manner that their second axes are somewhat downgrade toward a point P'2 intermediate between the left and right sides of the vehicle. The point P'2 is located at a height lower than the height of the point P'1 of FIG. 14. The rear elastic suspension elements are positioned to mount the suspension member 1 to the vehicle body at the respective suspension points G and H in such manner that their second axes are somewhat upgrade toward a point Q'2 intermediate between the left and right sides of the vehicle. The point Q'2 is located at a height lower than the height of the point Q'1 of FIG. 14. The virtual roll axis n of the suspension member 1 extends through the elastic center points P'2 and Q'2. In this embodiment, the virtual roll axis n is positioned below the roll center R. This condition is given by Equations (21) and (24).

$$(d_r \cdot Z_f + d_f Z_r)/(d_r + d_f) < hc \qquad (24)$$

If the elastic suspension elements are positioned to satisfy Equations (21) and (24), the lateral force f acting on the suspension member 1 at the roll center R will produce a moment M around the virtual roll axis n of the suspension member 1 to rotate the offside road wheel upward. As a result, the suspension member 1 subject to a roll angle change $\gamma_2$ tending to change the camber angle of the offset road wheel in the negative direction cancelling the camber angle change $\gamma_1$ produced in the positive direction. It is, therefore, possible to provide such an appropriate condition as to produce no camber angle. Consequently, the equivalent camber rigidity of the vehicle axle suspension can be increased to infinite value. This is effective to improve the vehicle control stability during a vehicle cornering operation.

Although the invention has be described mainly in connection with a multilink type vehicle rear axle suspension, it is to be noted that the invention is equally applicable to a vehicle front axle suspension. The invention is also applicable to either or both of the front and rear axle suspensions. Although the invention has been described in connection with a multilink type vehicle axle suspension, it is to be noted that the invention is equally applicable to any vehicle axle suspension which includes at least three elastic suspension elements located at different positions for elastically mounting the suspension member to the vehicle body. Although the invention has been described in connection with a multi link type vehicle axle suspension having a pair of front elastic suspension elements located in front of the axles and a pair of rear elastic suspension elements located behind the axles, it is to be noted that the vehicle axle suspension may have three or more front elastic suspension elements and three or more elastic suspension elements. In this case, the specification is read with the term "simple middle point" replaced with the term "simple center".

What is claimed is:

1. An axle suspension system for use with an automotive vehicle comprising:

road wheel support members for rotatably supporting road wheels;

a suspension member for supporting the road wheel support members for vertical swinging movement; and elastic suspension element including at least one front elastic suspension element positioned in front of the road wheel support members for elastically mounting the suspension member to the vehicle and at least two rear elastic suspension elements positioned at different suspension points behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center determined by suspension geometry, to rotate the suspension member around a virtual roll axis extending through an elastic center of the front elastic suspension element and an elastic center of the rear elastic suspension elements;

wherein the elastic suspension elements are positioned to place the suspension roll center below an upgrade of the virtual roll axis in a forward direction of the vehicle.

2. An axle suspension system for use with an automotive vehicle comprising:

road wheel support members for rotatably supporting road wheels;

a suspension member for supporting the road wheel support members for vertical swinging movement; and elastic suspension elements including at least one front elastic suspension element positioned in front of the road wheel support members for elastically mounting the suspension member to the vehicle and at least two rear elastic suspension elements positioned at different suspension points behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through an elastic center of the front elastic suspension elements and an elastic center of the rear elastic suspension elements;

wherein the elastic suspension elements are positioned to place the suspension roll center above a downgrade of the virtual roll axis in a forward direction of the vehicle.

3. An axle suspension system for use with an automotive vehicle comprising:

road wheel support members for rotatably supporting road wheels;

a suspension member for supporting the road wheel support members for vertical swinging movement; and elastic suspension elements including at least two front elastic suspension elements positioned at different suspension points in front of the road wheel support members for elastically mounting the suspension member to the vehicle and at least one rear elastic suspension element positioned behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through an elastic center of the front elastic suspension elements and an elastic center of the rear elastic suspension element;

wherein the elastic suspension elements are positioned to place the suspension roll center below an upgrade of the virtual roll axis in a forward direction of the vehicle.

4. An axle suspension system for use with an automotive vehicle comprising:

road wheel support members for rotatably supporting road wheels;

a suspension member for supporting the road wheel support members for vertical swinging movement; and elastic suspension elements including at least two front elastic suspension elements positioned at different suspension points in front of the road wheel support members for elastically mounting the suspension member to the vehicle and at least one rear elastic suspension element positioned behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through an elastic center of the front elastic suspension elements and an elastic center of the rear elastic suspension element;

wherein the elastic suspension elements are positioned to place the suspension roll center above a downgrade of the virtual roll axis in a forward direction of the vehicle.

5. An axle suspension system for use with an automotive vehicle comprising:

road wheel support members for rotatably supporting road wheels;

a suspension member for supporting the road wheel support members for vertical swinging movement; and elastic suspension elements including a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through an elastic center intermediate the front elastic suspension elements and an elastic center intermediate the rear elastic suspension elements;

wherein the elastic suspension elements are positioned to place the suspension roll center below an upgrade of the virtual roll axis in a forward direction of the vehicle.

6. An axle suspension system for use with an automotive vehicle comprising:

road wheel support members for rotatably supporting road wheels;

a suspension member for supporting the road wheel support members for vertical swinging movement; and elastic suspension elements including a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle, each of the elastic suspension elements having no anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through an elastic center intermediate the front elastic suspension elements and an elastic center intermediate the rear elastic suspension elements;

wherein the elastic suspension elements are positioned to place the suspension roll center above a downgrade of the virtual roll axis in a forward direction of the vehicle.

7. An axle suspension system for use with an automotive vehicle comprising:

road wheel support members for rotatably supporting road wheels;

a suspension member for supporting the road wheel support members for vertical swinging movement; and elastic suspension elements including at least one front elastic suspension element provided in front of the road wheel support members for elastically mounting the suspension member to the vehicle and at least two rear elastic suspension elements provided at different suspension points behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through a virtual elastic center determined and based on the anisotrophy of the front elastic suspension element and a virtual elastic center determined and based on the anisotrophy of the rear elastic suspension elements;

wherein the elastic suspension elements are positioned to place the suspension roll center below an upgrade of the virtual roll axis in a forward direction of the vehicle.

8. An axle suspension system for use with an automotive vehicle comprising:

road wheel support members for rotatably supporting road wheels;

a suspension member for supporting the road wheel support members for vertical swinging movement; and elastic suspension elements including at least one front elastic suspension element provided in front of the road wheel support members for elastically mounting the suspension member to the vehicle and at least two rear elastic suspension elements provided at different suspension points behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through a virtual elastic center determined and based on the anisotrophy of the front elastic suspension element and a virtual elastic center determined and based on the anisotrophy of the rear elastic suspension elements;

wherein the elastic suspension elements are positioned to place the suspension roll center above a downgrade of the virtual roll axis in a forward direction of the vehicle.

9. An axle suspension system for use with an automotive vehicle comprising:

road wheel support members for rotatably supporting road wheels;

a suspension member for supporting the road wheel support members for vertical swinging movement; and elastic suspension elements including at least two front elastic suspension elements provided at different suspension points in front of the road wheel support members for elastically mounting the suspension member to the vehicle and at least one rear elastic suspension element provided behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through a virtual elastic center determined and based on the anisotrophy of the front elastic suspension elements and a virtual elastic center determined and based on the anisotrophy of the rear elastic suspension element;

wherein the elastic suspension elements are positioned to place the suspension roll center below an upgrade of the virtual roll axis in a forward direction of the vehicle.

10. An axle suspension system for use with an automotive vehicle comprising:

road wheel support members for rotatably supporting road wheels;

a suspension member for supporting the road wheel support members for vertical swinging movement; and elastic suspension elements including at least two front elastic suspension elements provided at different suspension points in front of the road wheel support members for elastically mounting the suspension member to the vehicle and at least one rear elastic suspension element provided behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center determined by suspension geometry to rotate the suspension member around a virtual roll axis extending through a virtual elastic center determined and based on the anisotrophy of the front elastic suspension elements and a virtual elastic center determined and based on the anisotrophy of the rear elastic suspension element;

wherein the elastic suspension elements are positioned to place the suspension roll center above a downgrade of the virtual roll axis in a forward direction of the vehicle.

11. An axle suspension system for use with an automotive vehicle comprising:

road wheel support members for rotatably supporting road wheels;

a suspension member for supporting the road wheel support members for vertical swinging movement; and elastic suspension elements including a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through a virtual elastic center determined and based on the anisotrophy of the front elastic suspension elements and a virtual elastic center determined and based on the anisotrophy of the rear elastic suspension elements;

wherein the elastic suspension elements are positioned to place the suspension roll center below an upgrade of the virtual roll axis in a forward direction of the vehicle.

12. An axle suspension system for use with an automotive vehicle comprising:

road wheel support members for rotatably supporting road wheels;

a suspension member for supporting the road wheel support members for vertical swinging movement; and elastic suspension elements including a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle, each of the elastic suspension elements having an anisotrophy in a direction where the elastic suspension element is strained;

the elastic suspension elements being positioned to provide an understeer characteristic when a lateral force acts on a suspension roll center, determined by suspension geometry, to rotate the suspension member around a virtual roll axis extending through a virtual elastic center determined and based on the anisotrophy of the front elastic suspension elements and a virtual elastic center determined and based on the anisotrophy of the rear elastic suspension elements;

wherein the elastic suspension elements are positioned to place the suspension roll center above a downgrade of the virtual roll axis in a forward direction of the vehicle.

13. An axle suspension system for use with an automotive vehicle comprising:

road wheel support members for rotatably supporting road wheels;

a suspension member for supporting the road wheel support members for vertical swinging movement;

elastic suspension elements including at least one front elastic suspension element provided in front of the road wheel support members for elastically mounting the suspension member to the vehicle and at least two rear elastic suspension elements provided at different suspension points behind the road wheel support members for elastically mounting the suspension member to the vehicle, each of the elastic suspension elements having an anisotropy in a direction where the elastic suspension element is strained;

a virtual roll axis extending through a virtual elastic center determined and based on the anisotropy of the front elastic suspension element and a virtual elastic center determined and based on the anisotropy of the rear elastic suspension elements;

an elastic axis extending through a simple center of the front elastic suspension element and a simple center of the rear elastic suspension elements;

the elastic suspension elements being positioned to place the virtual roll axis below the elastic axis at least in a direction of height of a plane including a road wheel axis and normal to a vehicle longitudinal axis.

14. An axle suspension system for use with an automotive vehicle comprising:

road wheel support members for rotatably supporting road wheels;

a suspension member for supporting the road wheel support members for vertical swinging movement;

elastic suspension elements including at least two front elastic suspension elements provided at different suspension points in front of the road wheel support members for elastically mounting the suspension member to the vehicle and at least one rear elastic suspension element behind the road wheel support members for elastically mounting the suspension member to the vehicle, each of the elastic suspension elements having an anisotropy in a direction where the elastic suspension element is strained;

a virtual roll axis extending through a virtual elastic center determined and based on the anisotropy of the front elastic suspension elements and a virtual elastic center determined and based on the anisotropy of the rear elastic suspension element;

an elastic axis extending through a simple center of the front elastic suspension elements and a simple center of the rear elastic suspension element;

the elastic suspension elements being positioned to place the virtual roll axis below the elastic axis at least in a direction of height of a plane including a road wheel axis and normal to a vehicle longitudinal axis.

15. An axle suspension system for use with an automotive vehicle comprising:

road wheel support members for rotatably supporting road wheels;

a suspension member for supporting the road wheel support members for vertical swinging movement;

elastic suspension elements including a pair of front elastic suspension elements provided at different suspension points in front of the road wheel support members for elastically mounting the suspension member to the vehicle and a pair of rear elastic suspension elements provided at different suspension points behind the road wheel support members for elastically mounting the suspension member to the vehicle, each of the elastic suspension elements having an anisotropy in a direction where the elastic suspension element is strained;

a virtual roll axis extending through a virtual elastic center determined and based on the anisotropy of the front elastic suspension elements and a virtual elastic center determined and based on the anisotropy of the rear elastic suspension elements;

an elastic axis extending through a point intermediate the front elastic suspension elements and a point intermediate the rear elastic suspension elements;

the elastic suspension elements being positioned to place the virtual roll axis below the elastic axis at least in a direction of height of a plane including a road wheel axis and normal to a vehicle longitudinal axis.

* * * * *